United States Patent [19]

Toyoda

[11] Patent Number: 5,595,061
[45] Date of Patent: Jan. 21, 1997

[54] CATALYST DETERIORATION-DETECTING DEVICE FOR INTERNAL COMBUSTION ENGINE

[75] Inventor: Katsuhiko Toyoda, Shizuoka-ken, Japan

[73] Assignee: Suzuki Motor Corporation, Hamamatsu, Japan

[21] Appl. No.: 503,379

[22] Filed: Jul. 17, 1995

[30] Foreign Application Priority Data

Jul. 30, 1994 [JP] Japan ................................. 6-197499

[51] Int. Cl.$^6$ ...................................................... F01N 3/20
[52] U.S. Cl. ................................. 60/274; 60/276; 60/277
[58] Field of Search ............................ 60/274, 277, 276

[56] References Cited

U.S. PATENT DOCUMENTS 5,337,557  8/1994  Toyoda .
5,379,587  1/1995  Toyoda .

*Primary Examiner*—Douglas Hart
*Attorney, Agent, or Firm*—Flynn, Thiel, Boutell & Tanis, P.C.

[57] ABSTRACT

A catalyst deterioration-detecting device is provided with a control which includes a catalyst deterioration-determining section. When predetermined catalyst deterioration-determining conditions are established, the determining section determines a degraded state of the catalyst body by taking the successive steps of: respectively measuring first and second voltage signal-inverted states within a predetermined arithmetic operating time in accordance with inverted states of first and second voltage signals, thereby calculating an inverted state ratio; respectively measuring first and second voltage signal-surrounding areas within the predetermined arithmetic operating time in accordance with respective areas which are surrounded by loci of periods of time during which the first and second voltage signals are inverted, thereby calculating an area ratio; respectively measuring first and second voltage signal states within the predetermined arithmetic operating time in accordance with the first and second voltage signals, thereby calculating a voltage ratio; calculating a catalyst deterioration-measured value on the basis of the inverted state ratio, the area ratio, and the voltage ratio; and, comparing the catalyst deterioration-measured value and a catalyst deterioration-determining value, the latter being set for each engine load.

2 Claims, 7 Drawing Sheets

CATALYST DETERIORATION-DETERMINING VALUE (CREK)

A : RESTRICTED VALUE

CATALYST DETERIORATION-DETECTING DEVICE FOR INTERNAL COMBUSTION ENGINE

FIELD OF THE INVENTION

This invention relates to a catalyst deterioration-detecting device for an internal combustion engine. More particularly, it relates to an improved, catalyst deterioration-detecting device for an internal combustion engine which enables accurate determination as to a deteriorated state of a catalyst body.

BACKGROUND OF THE INVENTION

In vehicles, a catalyst body is provided midway along an exhaust passage in an exhaust system in order to purify exhaust emissions which are discharged from an internal combustion engine. In some of the internal combustion engines, there is provided a catalyst deterioration-detecting device which includes a control means for determining the deterioration of the catalyst body when predetermined catalyst deterioration-determining conditions are established. The control means provides first feedback control of an air-fuel ratio toward a target value in accordance with a first voltage signal which is output by a front oxygen sensor. Further, the control means executes second feedback control of the air-fuel ratio so as to correct the first feedback control in accordance with a second voltage signal which is output by a rear oxygen sensor. The front oxygen sensor, which is a first exhaust sensor, is disposed in an exhaust passage of the engine on an upstream side of the catalyst body. The rear oxygen sensor, which is the second exhaust sensor, is disposed in the exhaust passage on a downstream side of the catalyst body.

Examples of the above detecting device are disclosed, e.g., in published Japanese Patent Applications Laid-Open Nos. 5-240089 and 6-81634.

According to Laid-Open No. 5-240089 (and corresponding U.S. Pat. No. 5,337,557), second feedback control of the rear oxygen sensor is subjected to change in a correction-determining time and a correction quantity in accordance with a state of output periods of a second detection signal from the rear oxygen sensor. A second feedback control-learning value of the rear oxygen sensor is calculated from: an arithmetic mean, which is calculated from both a previous skip value ante-value and a present skip value ante-value for each skipping of a second feedback control value; and, an arithmetic mean value which is calculated in accordance with a state of the output periods of the aforesaid second detection signal. As result, the above calculated learning value provides feedback control of an air-fuel ratio.

According to the aforesaid Japanese Patent Application Laid-Open No. 6-81634 (and corresponding U.S. Pat. No. 5,379,587), when predetermined deterioration judgement-executing conditions are satisfied, both period and area ratios of first and second detection signals within a predetermined arithmetic operating time are corrected by a correction value, thereby producing a deterioration-judging arithmetic value. The arithmetic value is used to make a calculation so as to determine a degraded State of the catalyst body. In this way, the area ratio as well as the period ratio of the first and second detection signals are calculated and multiplied together; and, the deterioration-judging arithmetic value, which is corrected by a correction value, is obtained to pass a judgment. As a result, it is possible to precisely measure a degraded state of the catalyst body, thereby providing improved accuracy in determining the degraded state. In short, according to Application No. 6-81634, the deterioration-judging arithmetic value (REKCAT), which is catalyst deterioration-judging/measured values, is determined from: $REKCAT = SR \times SHUKI \times \alpha$, where SR is an area ratio, SHUKI is a period ratio, and $\alpha$ is a correction factor according to an exhaust temperature, and engine load, and the like.

In the catalyst deterioration-detecting device for the internal combustion engine, the catalyst body does not materially detract from its function so far as vehicles which are in normal use.

However, when a vehicle user uses, e.g., leaded fuel, or when a misfire results from a high-tension cord being pulled out of position as a result of other unexpected causes, the function of the catalyst body is dramatically reduced by either diminished catalytic function or damaged catalyst body due to lead-causing poison or high temperature. The reduced function of the catalyst body reduces the exhaust-purifying rate.

This causes an inconvenience in that a large amount of unpurified exhaust gas is liberated in the air, which contributes to environmental aggravation.

Further, low precision in determining catalyst deterioration causes the catalyst body to be judged as abnormal in spite of being normal. This causes inconveniences in that users experience a feeling of uneasiness, with a consequential loss of the reliability of vehicles, and further the users are urged to do needless repair of vehicles or unnecessary replacement of parts, with a concomitant increase in both an after-sales-service man hour and repairing cost.

In order to obviate the aforesaid inconveniences, the present invention provides a catalyst deterioration-detecting device for an internal combustion engine, having first and second exhaust sensors disposed in an exhaust passage of the internal combustion engine respectively on upstream and downstream sides of a catalyst body, the catalyst body being placed generally midway along the exhaust passage, which catalyst deterioration-detecting device effects first feedback control of an air-fuel ratio toward a target value in accordance with a first voltage signal which is output by the first exhaust sensor, while performing a second feedback control of the air-fuel ratio so as to correct the first feedback control in accordance with a second voltage signal which is output by the second exhaust sensor, whereby the deterioration of the catalyst body is determined when predetermined catalyst deterioration-determining conditions are fulfilled, the improvement comprising: a control means having a catalyst deterioration-determining section which determines a degraded state of the catalyst body, when the predetermined catalyst deterioration-determining conditions are established, by taking the sequential steps of: respectively measuring first and second voltage signal-inverted states within a predetermined arithmetic operating time in accordance with inverted states of first and second voltage signals, thereby calculating an inverted state ratio; respectively measuring first and second voltage signal-surrounding areas within the predetermined arithmetic operating time in accordance with respective areas which are surrounded by loci of periods of time during which the first and second voltage signals are inverted, thereby calculating an area ratio; respectively measuring first and second voltage signal states within the predetermined arithmetic operating time in accordance with the first and second voltage signals, thereby calculating a voltage ratio; calculating a catalyst deterioration-Measured value on the basis of the inverted state ratio, the area ratio, and the voltage ratio; and, comparing the catalyst deterioration-measured value and a catalyst deterioration-determining value, the latter value being set for each engine load.

According to the structure incorporating the present invention, when predetermined catalyst deterioration-determining conditions are met, the catalyst deterioration-determining section of the control means take the successive steps of: respectively measuring the first and second voltage signal-inverted states within a predetermined arithmetic operating time in accordance with inverted states of the first and second voltage signals, thereby calculating an inverted state ratio; respectively measuring the first and second voltage signal-surrounding areas within the predetermined arithmetic operating time in accordance with respective areas which are surrounded by loci of periods of time during which the first and second voltage signals are inverted, thereby calculating an area ratio; respectively measuring the first and second voltage signal states within the predetermined arithmetic operating time in accordance with the first and second voltage signals, thereby calculating a voltage ratio; calculating a catalyst deterioration-measured value on the basis of the inverted state ratio, the area ratio, and the voltage ratio; and, comparing the catalyst deterioration-measured value and the catalyst deterioration-determining value, the latter being set for each engine load. The determining section thereby determines a degraded state of the catalyst body. The use of the preceding control means provides simulative determination as to a degraded state of the catalyst body, thereby enabling accurate judgment on a state of catalyst deterioration, even in consideration of dispersion in measurements as well as vehicles/parts. Furthermore, the degraded state of the catalyst body is determined with reference to the catalyst deterioration-measured value, thereby making it possible to improve the accuracy of judgment on catalyst degradation. Moreover, the reliability of vehicles is enhanced, which further avoids needless repair or replacement of parts, Yet further, environmental aggravation can be prevented because precise repair is achievable when the catalyst body is abnormal.

DETAILED DESCRIPTION

An embodiment of the present invention will now be described in specific detail with reference to the drawings.

Figure 11:
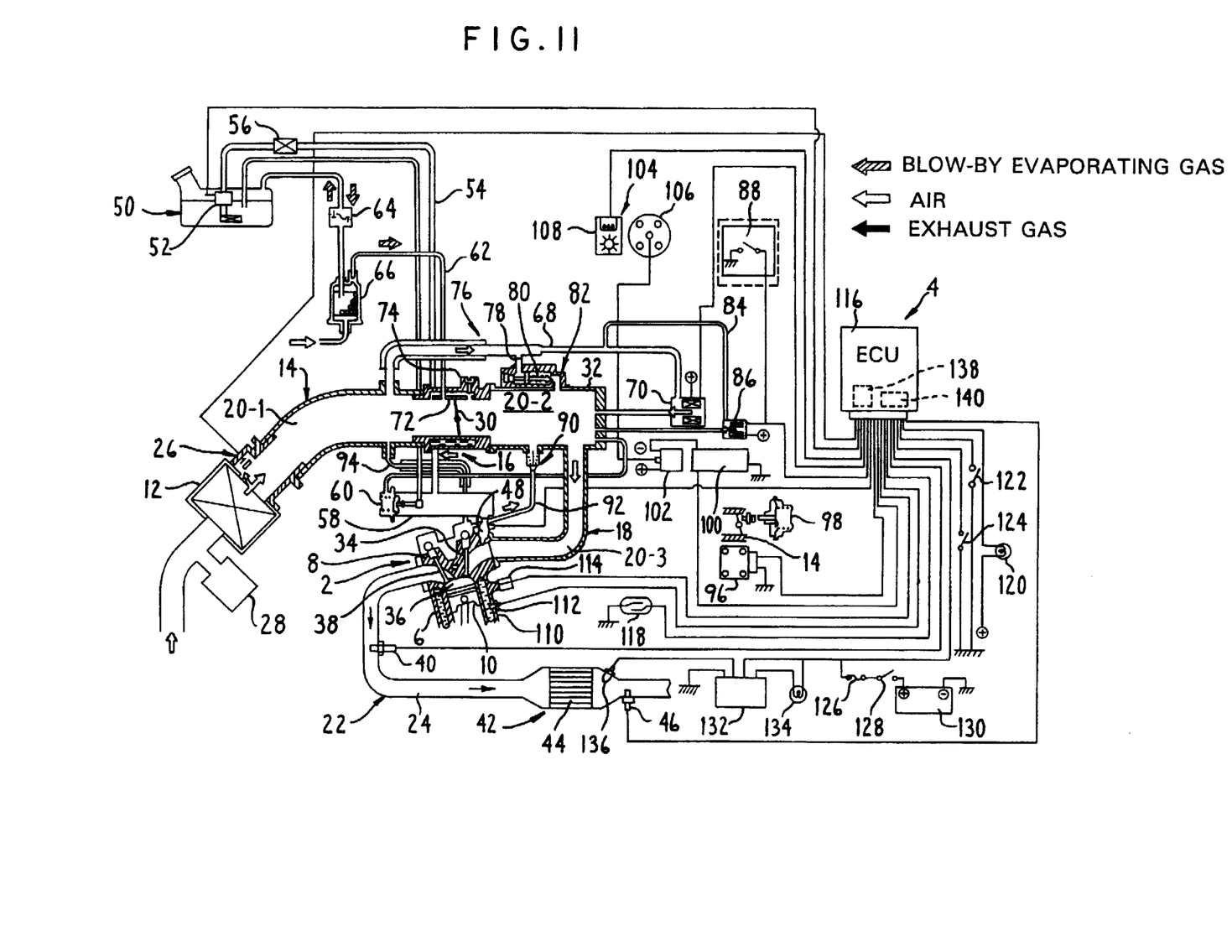
FIG. 11 is a diagram depicting a systematic construction which includes an internal combustion engine and the catalyst deterioration-detecting device.

In FIG. 11, reference numeral 2 denotes an internal combustion engine of a fuel injection control type; 4 a catalyst deterioration-detecting device; 6 a cylinder block; 8 a cylinder head; 10 a piston; 12 an air cleaner; 14 an air intake pipe; 16 a throttle body; 18 an intake manifold; 20 an air intake passage; 22 an air exhaust pipe; and, 24 an air exhaust passage.

The intake pipe 14 is provided between the air cleaner 12 and the throttle body 16. A first intake passage 20-1 is formed in the intake pipe 14. An air flow meter 26 is disposed on an upstream side of the intake pipe 14 for measuring an inducted air quantity.

A resonator 28 is provided on an upstream side of the air cleaner 12 for reducing an inlet air-emitting sound. The throttle body 16 has a second intake passage 20-2 formed therein which communicates with the first intake passage 20-1. An intake air throttle valve 30 is provided in the second intake passage 20-2. Further, the second intake passage 20-2 communicates with a third intake passage 20-3 via a surge tank 32. The third intake passage 20-3 is formed in the intake manifold 18. A downstream side of the third intake passage 20-3 communicates with a combustion chamber 36 of the internal combustion engine 2 via an air intake valve 34. A combustion chamber 36 communicates with the exhaust passage 24 via an air exhaust valve 38.

Figure 9:
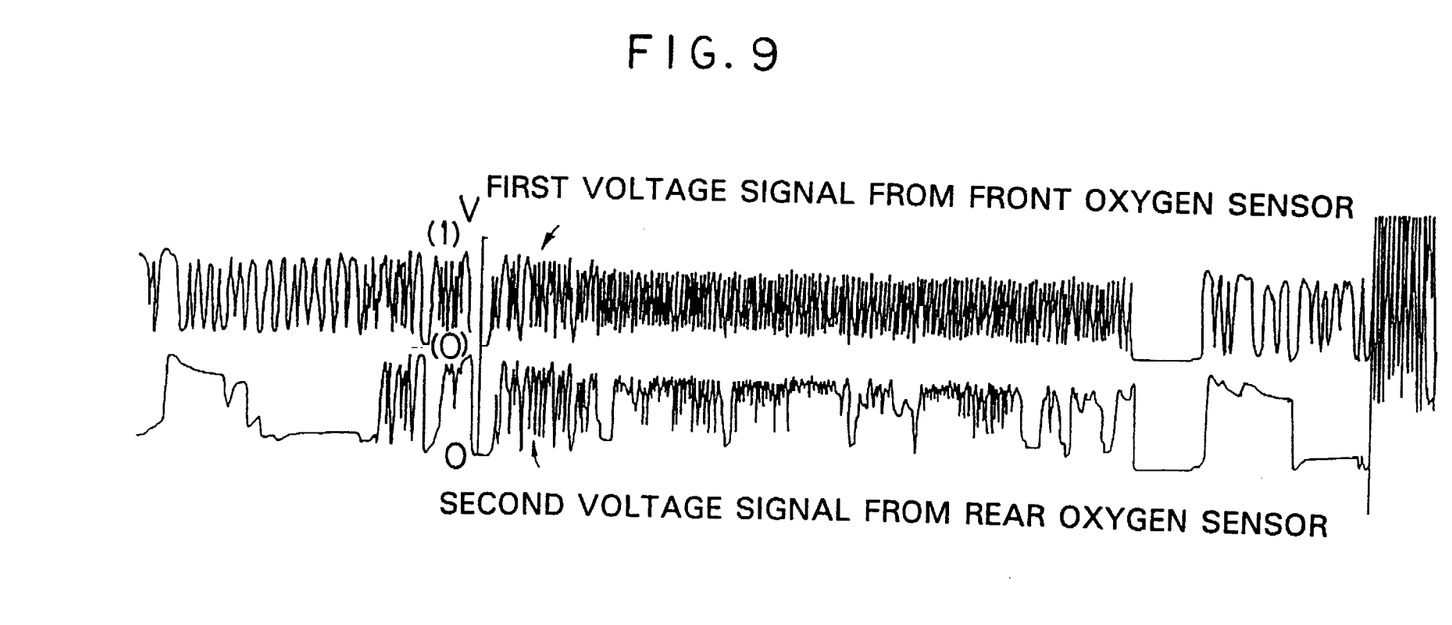
FIG. 9 is a wave form chart illustrating a first voltage signal from the front oxygen sensor and a second voltage signal from the rear oxygen sensor.

The exhaust pipe 22 is provided with a front oxygen sensor 40, which is a first exhaust sensor with a heater, and a catalyst body 44 of a catalytic converter 2. These components 40 and 44 are arranged in turn from the side of the engine 2. The front oxygen sensor 40 is disposed in the exhaust passage 24 on an upstream side of the catalyst body 44 in order to detect a concentration of oxygen in exhaust emissions therearound in the passage 24. The sensor 40 outputs a first voltage signal in response to the detection, which signal includes inverting rich and lean signals (see FIG. 9).

A rear oxygen sensor 46, which is a second exhaust sensor, is disposed in the exhaust pipe 22 on a downstream side of the catalyst body 44. The rear oxygen sensor 46 detects a concentration of oxygen in exhaust gases in the exhaust passage 24 on the downstream side of the catalyst body 44. The sensor 46 outputs a second voltage signal in response to the detection, which signal includes inverting rich and lean signals (see FIG. 9).

A fuel injection valve 48 is attached at a location where the intake manifold 18 and the cylinder head 8 are jointed together. The fuel injection valve 48 is oriented toward the combustion chamber 36.

Fuel in a fuel tank 50 is fed under pressure to the fuel injection valve 48. More specifically, the fuel in the tank 50 is pumped under pressure into a fuel supply passage 54 by a fuel pump 52. The fuel is filtered through a fuel filter 56. The filtered fuel is led to a fuel distribution pipe 58 in which pressure on the fuel is regulated to a given level by a fuel pressure regulator 60 before the fuel is fed to the fuel injection valve 48.

There is an evaporative fuel passage 62 whose one end communicates with the upper inside of the fuel tank 50. The other end of the evaporative fuel passage 62 communicates with the second intake passage 20-2 of the throttle body 16. Further, a two-way valve 64 and a canister 66 are provided midway along the evaporative fuel passage 62. These two components 64 and 66 are positioned in sequence from the side of the fuel tank 50.

An idle bypass air passage 68 is provided for bypassing the intake air throttle valve 30 in order to intercommunicate the first intake passage 20-1 and the inside of the surge tank 32. An idle rotational speed control valve (an ISC valve) 70 is positioned generally midway along the idle bypass air passage 68. This valve 70 opens and closes the idle bypass air passage 68 so as to regulate an air quantity during idle operation.

Further, the throttle body 16 is formed with an auxiliary bypass air passage 72 which bypasses the intake air throttle valve 30. The passage 72 is opened and closed by an auxiliary bypass air quantity regulator 74.

An idle rotational speed controller 76 is formed by: the idle bypass air passage 68; the idle rotational speed control valve 70; the auxiliary bypass air passage 72; and the auxiliary bypass air quantity regulator 74.

The idle rotational speed controller 76 executes feedback control of an idle rotational speed of the engine 2 to a target idle rotational speed by means of the control valve 70. Further, the controller 76 regulates the aforesaid target speed by means of the regulator 74 which is located in the auxiliary bypass air passage 72. The passage 72 bypasses the intake air throttle valve 30 in order to intercommunicate the first intake passage 20-1 and the inside of the surge tank 32.

An air passage 78 is branched off from the idle bypass air passage 68 at a generally midway portion thereof, and communicates with the inside of the surge tank 32. The air passage 78 is provided with an air valve 80 which operates on engine cooling water temperature and the like. The air passage 78 and the air valve 80 form an air regulator 82.

Further, an air passage 84 for a power steering purpose is branched off from the idle bypass air passage 68 at a generally midway portion thereof, and communicates with the inside of the surge tank 32. In addition, a control valve 86 for the same purpose is provided midway along the air passage 84. The control valve 86 is operatively controlled by a switch 88 for the power steering purpose.

In order to cause blow-by gases generated in the engine 2 to flow back to an air suction system, the engine 2 has first and second blow-by gas-returning flow passages 92 and 94 communicated with each other at the cylinder head 8. The first passage 92 communicates with a PCV valve 90 which is mounted on the surge tank 32. The second passage 94 communicates with the first intake passage 20-1.

The intake pipe 14 is further provided with a throttle sensor 96 and a dashpot 98. The throttle sensor 96 detects an opened state of the intake air throttle valve 30. In addition, the throttle sensor 96 functions as an idle switch. The dashpot 98 prevents rapid closing of the throttle valve 30.

An ignition coil 102 communicates with a power unit 100 and a distributor 106. The distributor 106 constitutes an ignition mechanism 104.

Further, the internal combustion engine 2 is provided with a crank angle sensor 108 which detects a crank angle of the engine 2. The sensor 108 also serves as an engine rotational speed sensor.

In addition, the cylinder block 6 is provided with a water temperature sensor 112 and a knocking sensor 114. The water temperature sensor 112 detects the temperature of engine cooling water in a cooling water passage 110. The cooling water passage 110 is defined in the cylinder block 6. The knocking sensor 114 detects a knocking state of the engine 2.

The following components communicate with a control means (an engine control unit or ECU) 116: the air flow meter 26; the front oxygen sensor 40; the rear oxygen sensor 46; the fuel injection valve 48; the fuel pump 52; the idle rotational speed control valve 70; the control valve 86 and switch 88 for the power steering purpose; the throttle sensor 96; the power unit 100; the crank angle sensor 108; the water temperature sensor 112; and, the knocking sensor 114.

Further, the following components communicate with the control means 116: a vehicle velocity sensor 118; a diagnostic lamp 120; a diagnostic switch 122; a test switch 124; a battery 130 via two components, i.e., a fuse 126 and a main switch 128; and, a warning lamp 134 via an alarm relay 132. The alarm relay 132 communicates with, e.g., a thermosensor 136 which detects exhaust temperatures in the exhaust passage 24 on the downstream side of the catalyst body 44.

The control means 116 inputs various detection signals, and executes first feedback control of an air-fuel ratio toward a target value in accordance with a first voltage signal which is output by the front oxygen sensor 40. The control means 116 also provides second feedback control of the air-fuel ratio so as to correct the first feedback control in accordance with a second voltage signal which is output by the rear oxygen sensor 46.

Figure 10:
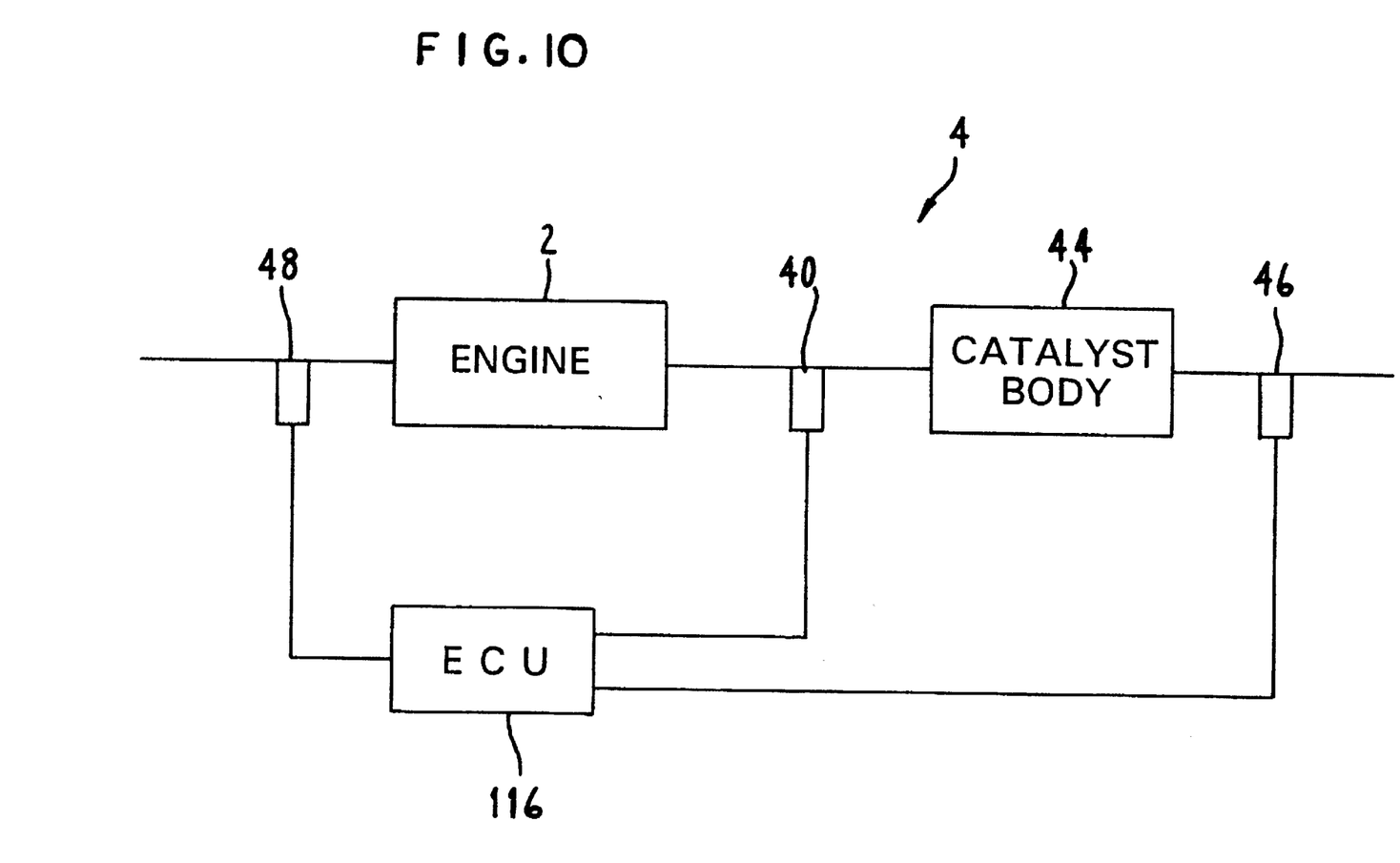
FIG. 10 is a block diagram showing a catalyst deterioration-detecting device.

In addition, the control means 116 is provided with a catalyst deterioration-determining section 138 and a timer 140 in order to determine the degradation of the catalyst body 44 when predetermined catalyst deterioration-determining conditions are established.

When the aforesaid conditions are met, the determining section 138 determines a degraded state of the catalyst body 44 by taking the successive steps of: respectively measuring first and second voltage signal-inverted states (e.g., the number of times of inversion, the number of periods) within a predetermined arithmetic operating time (TCAL) in accordance with inverted states of the first and second voltage signals from the front and rear oxygen sensors 40 and 46, thereby calculating an inverted state ratio (NFR) (e.g. a ratio indicating the number of times of inversion, a ratio indicating the number of periods); respectively measuring first and second voltage signal-surrounding areas within the predetermined arithmetic operating time (TCAL) in accordance with respective areas which are surrounded by loci of the periods of time during which the first and second voltage signals are inverted, thereby calculating an area ratio (SW); respectively measuring first and second voltage signal states within the predetermined arithmetic operating time (TCAL) in accordance with the first and second voltage signals, thereby calculating a voltage ratio (VFR); calculating a catalyst deterioration-measured value (REKCAT) on the basis of the inserted state ratio, the area ratio, and the voltage ratio; and, comparing the catalyst deterioration-measured value (REKCAT) and a catalyst deterioration-determining value (CREK), the latter being set for each engine load (e.g., an air quantity).

Figure 2:
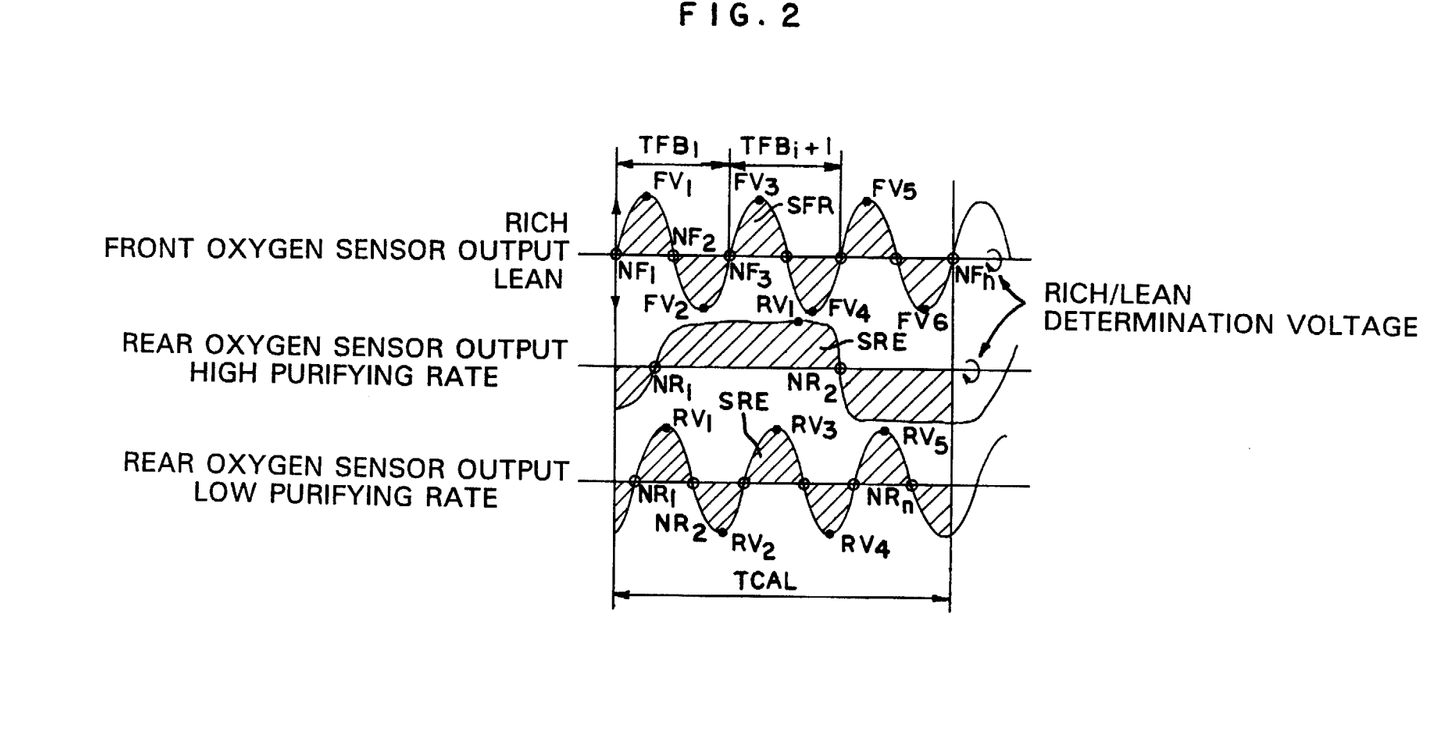
FIG. 2 is a wave form chart illustrating respective voltage signals from front and rear oxygen sensors.
Figure 3:
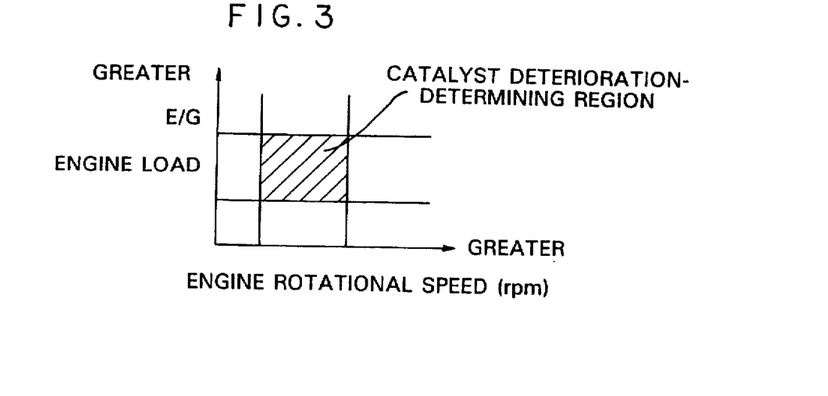
FIG. 3 is an illustration showing both a catalyst deterioration-determining region and catalyst deterioration-determining conditions.

As illustrated in FIG. 3, the above-described conditions for determining (monitoring) catalyst deterioration are established when the following are all satisfied: first feedback control in accordance with the front oxygen sensor (main oxygen sensor) 40 is under way; second feedback control (dual control) in accordance with the rear oxygen sensor 46 is under way; a limit falls within a catalyst deterioration-determining region (as designated by a slanted line portion in FIG. 3) which is established by an engine rotational speed and an engine load; warm-up of the engine 2 has been completed; an intake air temperature is at least a set value (the former equal to or greater than the latter); a constant speed regime is provided (which is the time when engine loads, such as an air quantity, a throttle opening degree, a fuel injection quantity, and an air supply pressure, remain fixed); and, the first voltage signal from the front oxygen sensor 40 has stabilized periods (TFBs in FIG. 2), i.e., |TFB$_1$ - TFBi|≦(KTFB) set value. The catalyst body 44 is subject to deterioration judgment (monitoring) when the catalyst deterioration-determining conditions are established.

The above deterioration judgment is canceled when a certain value (KTFB) is exceeded by the result of comparison which is sequentially made between: a first period (TFB$_1$) of the first voltage signal from the front oxygen sensor 40, at which the judgment (monitoring) as to the deterioration of the catalyst body 44 is started; and, subsequent periods (TFBi) at which the judgment (monitoring) is continued.

Figure 6:
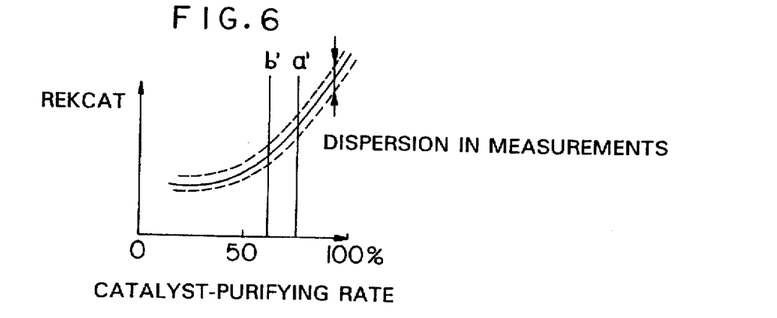
FIG. 6 is a graph illustrating a relationship between the catalyst-purifying rate and the catalyst deterioration-measured value according to the present embodiment.

To this end, the determination section 138 has the following built therein: a map defined by the engine load and the catalyst deterioration-measured value (REKCAT) (see FIG. 4); and, a map defined by a catalyst-purifying rate and the above measured value (REKCAT) (see FIG. 6).

More specifically, according to the present embodiment, the following is calculated from the first voltage signal state of the front oxygen sensor 40 and the second voltage signal state of the rear oxygen sensors 46: the inverted state ratio (NFR) (a ratio indicating the number of times of inversion, a ratio indicating the number of periods); the area ratio (SW); and, the voltage ratio (VFR). Then, the catalyst deterioration-measured value (REKCAT) is calculated within a predetermined arithmetic operating time (TCAL) in accordance with the following formula:

$$REKCAT = S_{FR}/S_{RE} \times_{NF}^{NR} \times Xa \times_{FV}^{RV} \times Xb$$

Next, the above measured value (REKCAT) is compared with the catalyst deterioration-determining value (CREK), the latter being established for each engine load, thereby simulating and determining the catalyst deterioration.

With respect to the above calculation of the catalyst deterioration-determining value (REKCAT), FIG. 2 illustrates a general case in which a degraded state of the catalyst body 44 is simulatively determined. In this case, such simulative determination can be made according to the area ratio, the period ratio, the ratio indicating the number of times of inversion, which ratios are all derived from the first and second voltage signal states of the front and rear oxygen sensors 40 and 46.

In FIG. 2, the following designations apply:

```
TFB:  FRONT OXYGEN FEEDBACK PERIOD
NF:   THE NUMBER OF TIMES OF FRONT OXYGEN
      RICH/LEAN INVERSION
FV:   FRONT OXYGEN MAX./MIN. VOLTAGES
NR:   THE NUMBER OF TIMES OF REAR OXYGEN
      RICH/LEAN INVERSION
         IN CASE OF NR > NF, ASSUME THAT
         NR = NF.
RV:   REAR OXYGEN MAX./MIN. VOLTAGES
         IN CASE OF NR < (2) AND NF < (2), ASSUME
         THAT NR = 0 AND
```

-continued

```
         NF = 0.
         IN CASE OF NFR ≦ NX, ASSUME
         THAT NFR = 0.
NX:   SET VALUE
```

Figure 5:
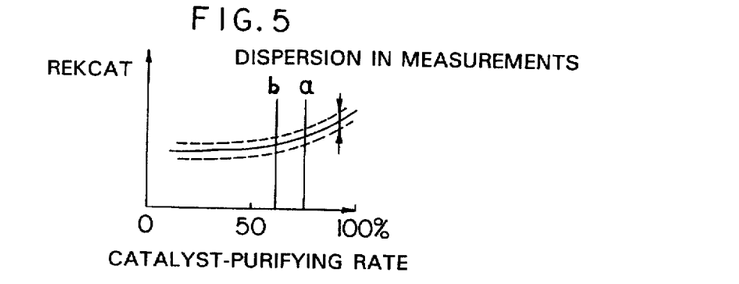
FIG. 5 is a graph showing a relationship between a catalyst-purifying rate and the catalyst deterioration-measured value.

FIG. 5 illustrates a case where calculations are based on only the area and period ratios and in which, when one catalyst body "a" and another "b", both of which are in different states of degradation, are desiredly judged as normal and deteriorated, respectively, there is a small difference in the deterioration-determining/measured values for executing the deterioration judgment, and further, as designated by broken lines in FIG. 5, there is dispersion in measurements as well as both parts and vehicles. In this case, however, the use of the simplex area and period ratios may cause either a normal catalyst body to be judged as abnormal, and vice versa.

In view of the above, the present invention employs weight factors, one of which multiplies the aforesaid area ratio and ratio indicating the number of times of inversion (a ratio indicating periods of time). The other of the weight factors multiplies the voltage ratio. As illustrated in FIG. 6, in this invention the use of the weight factors can provide a sharp slant, which is defined by the catalyst-purifying rate and the catalyst deterioration-measured value (REKCAT), when different catalyst-purifying rates of the catalyst bodies "a" and "b" need to be distinguished. As a result, an accurate judgment is formed, even in consideration of the dispersion in measurements as well as parts/vehicles.

Figure 7:
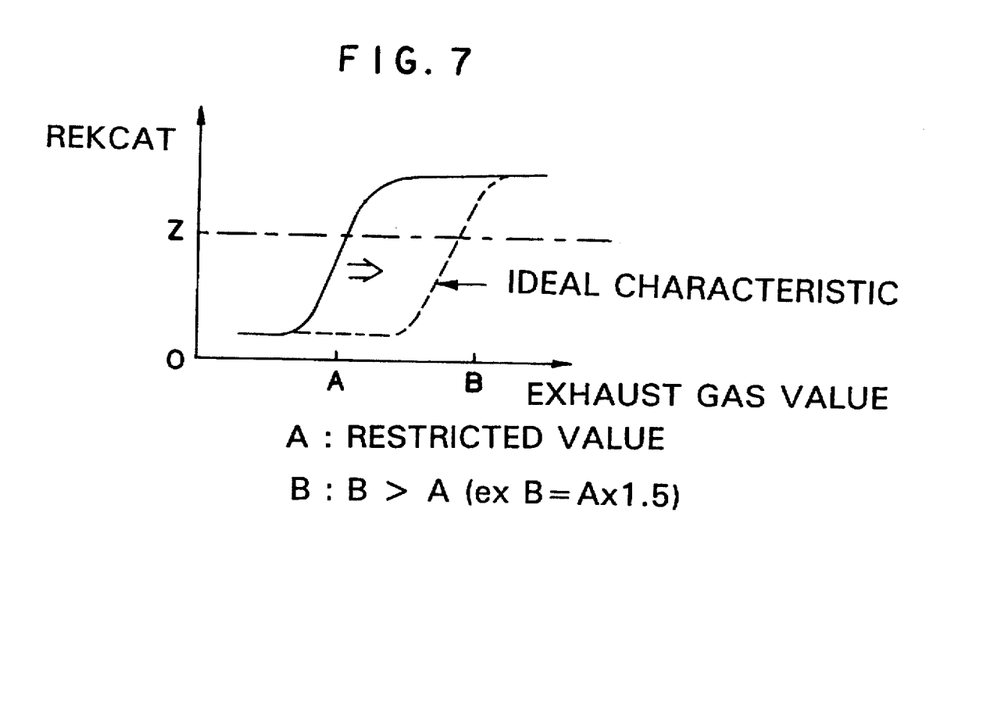
FIG. 7 is a graph showing one relationship between an exhaust gas value and the catalyst deterioration-measured value.
Figure 8:
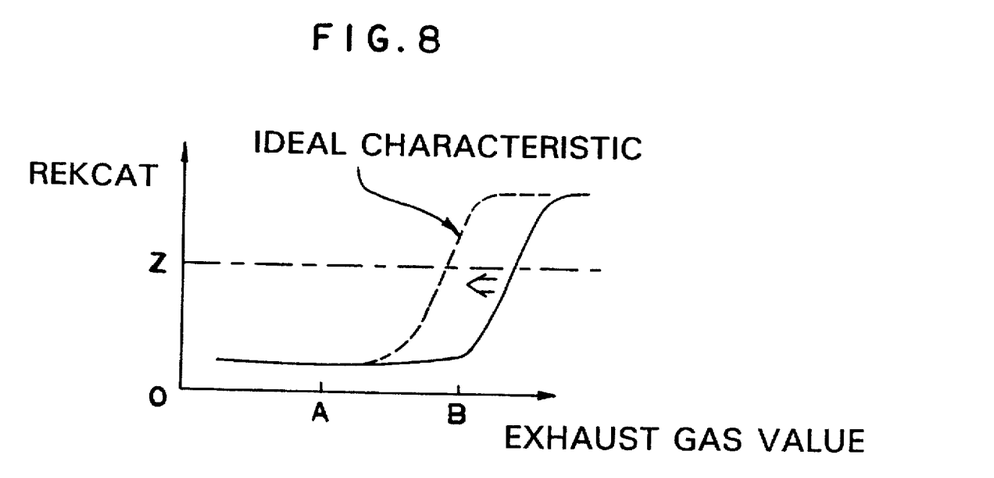
FIG. 8 is a graph showing another relationship between the exhaust gas value and the catalyst deterioration-measured value.

Referring to FIGS. 7 and 8, the reason why the above weight factor (Xa, Yb) is taken into consideration is that right and left deviations along x-coordinates of FIGS. 7 and 8 occur, which precludes accurate determination. Even when the catalyst body itself is deteriorated in a fixed state, such deviations develop as a result of different systems of fuel control or different types of vehicles.

Figure 1:
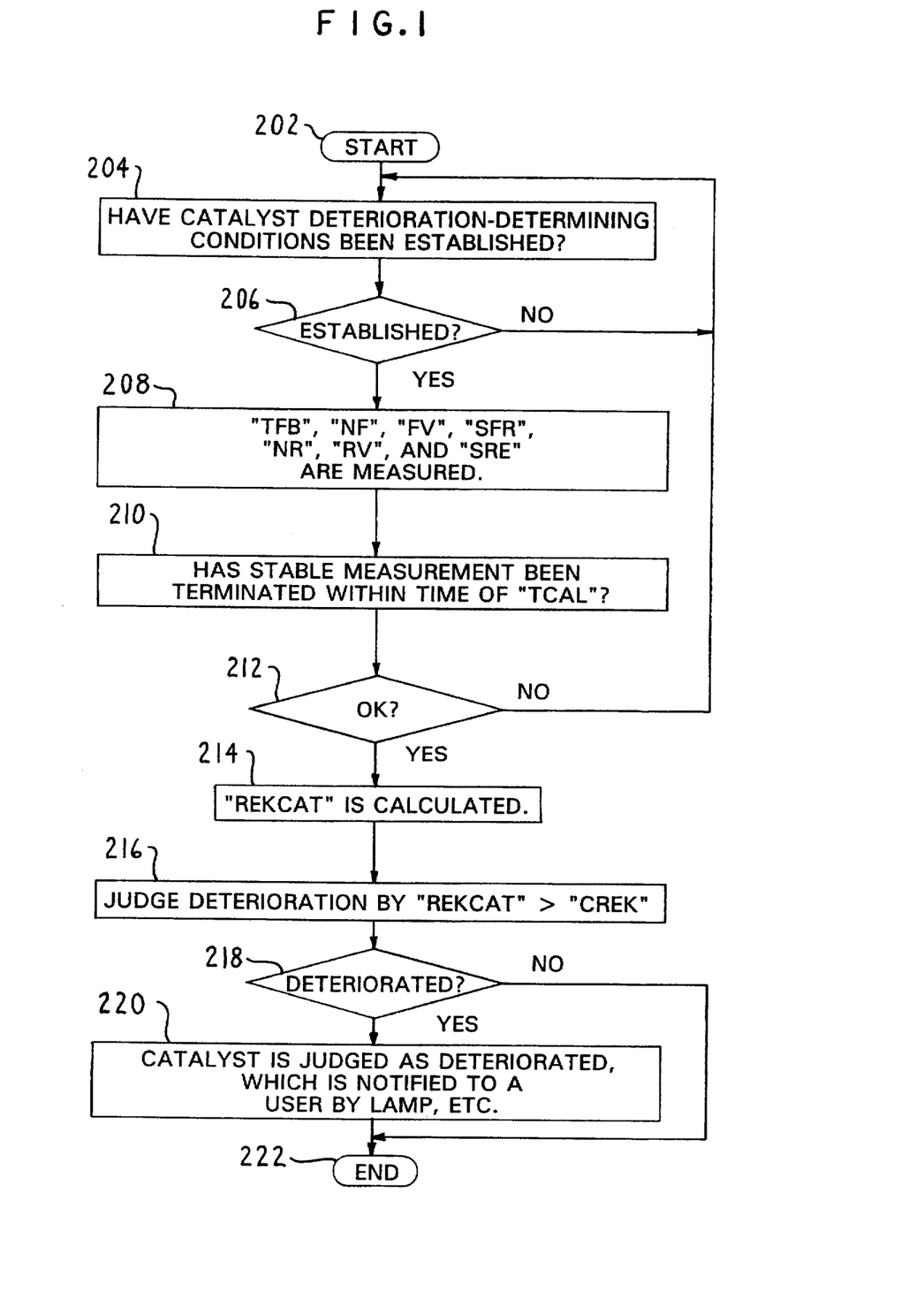
FIG. 1 is a flow chart illustrating a judgment on catalyst deterioration.

Next, the operation of the present embodiment will be described with reference to a flow chart of FIG. 1.

Upon start of an internal combustion engine 2, a catalyst deterioration-determining program in a control means 116 starts with step 202. The program is advanced to step 204 at which predetermined catalyst deterioration-determining (monitoring) conditions are initially read. At next step 206, it is determined whether or not the above conditions have been established.

As shown in FIG. 3, the preceding conditions are established when the following are all satisfied: first feedback control in accordance with the front oxygen sensor (main oxygen sensor) 40 is in progress; second feedback control (dual control) in accordance with the rear oxygen sensor 46 is in progress; a limit falls within a catalyst deterioration-determining region which is established by an engine rotational speed and an engine load; warm-up of the engine 2 has been completed; an intake air temperature is at least a set value (the former equal to or greater than the latter); a constant speed regime is provided (which is the time when engine loads, such as an air quantity, a throttle opening degree, a fuel injection quantity, and an air supply pressure, remain constant); and, the first voltage signal from the front oxygen sensor 40 has stable periods (TFBs in FIG. 2 ), i.e., |TFB$_1$ - TFBi|≦(KTFB) set value When the determination in step 206 is "NO" the program is returned to step 204.

When the determination in step 206 is "YES" the following measurements are made at next step 208: the periods (TFBs) of the first voltage signal from the front oxygen sensor 40; the number of times of rich/lean inversion (NFs)

of the second voltage signal from the sensor 40; Max./Min. voltages (FVs) of the second voltage signal from the sensor 40; the surrounding areas (SFRs) of the first voltage signal from the sensor 40; the number of times of rich/lean inversion (NRs) of the rear oxygen sensor 46; Max./Min. voltages (RVs) of the second voltage signal from the sensor 46; and, the surrounding areas (SREs) of the second voltage signal from the sensor 46.

At step 210, it is input whether or not the above-mentioned values have been stably measured within the predetermined arithmetic operating time (TCAL). At next step 212, it is decided whether or not the measurements have been at an end.

When the decision in step 212 is "NO", the program is returned to step 204.

When the decision in step 212 is "YES", the catalyst deterioration-measured value (REKCAT) is calculated at step 214 in accordance with FIG. 2 and the following formula:

(Arithmetic Expression)
Ratio indicating the number of times of inversion (NFR): (1)

$$NFR = \frac{NR(\text{within time of } TCAL)}{NF(\text{within time of } TCAL)}$$

Area ratio (SW): (2)

$$SW = \frac{SRE(\text{within time of } TCAL)}{SFR(\text{within time of } TCAL)}$$

Voltage ratio (VFR): (3)

$$FV = \text{either } \sum_{i=1}^{n} |FV_i - FV_{i+1}| \text{ or } \sum_{i=1}^{n} |FV_i - FV_{i+1}|/n$$

$$RV = \text{either } \sum_{i=1}^{n} |RV_i - RV_{i+1}| \text{ or } \sum_{i=1}^{n} |RV_i - RV_{i+1}|/n$$

$$VFR = \frac{RV}{FV}$$

Catalyst deterioration-measured value (REKCAT): (4)
REKCAT = SW × NFR × Xa × VFR × Xb
where Xa is a correction factor for NFR, as weight addition, and
Xb7 is a correction factor for VFR, as weight addition.
Note that the aforesaid ratio indicating the number of times of inversion can be replaced by a period ratio between the front and rear oxygen sensors.

Figure 4:
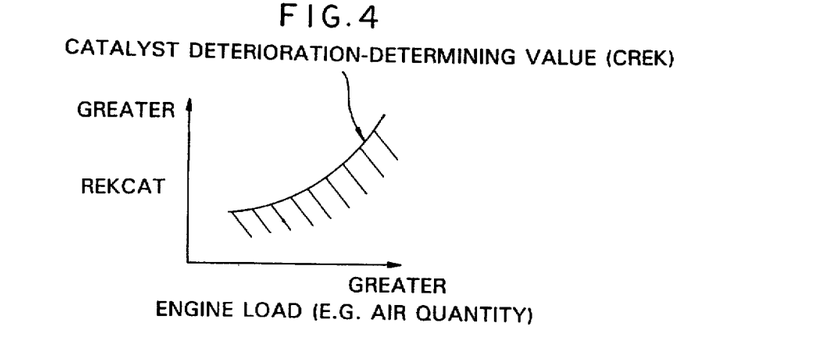
FIG. 4 is a graph showing a relationship between an engine load and a catalyst deterioration-measured value.

At next step 216, degradation judgment is initiated in accordance with the catalyst deterioration-measured value (REKCAT) and catalyst deterioration-determining value (CREK) of FIG. 4. At step 218, it is determined whether the catalyst body 44 has been degraded, i.e., whether or not REKCAT>CREK.

When the determination in this step 218 is "YES", the catalyst body 44 is judged as degraded. This judgment is signaled, at step 220, to a user by means of a lamp or the like. Then, the program ends with step 222.

When the determination in step 218 is "NO" the program is brought to an immediate end at step 222.

In conclusion, a state of catalyst degradation can precisely be determined because a degraded state of the catalyst body 44 is simulatively determined as a result of comparison between the catalyst deterioration-measured value (REKCAT) and the catalyst deterioration-determining value (CREK), and further because such simulative determination is executed when the first voltage signal is stable. The above measured value (REKCAT) is determined within a predetermined arithmetic operating time (TCAL) in accordance with the formula:

$$REKCAT = \frac{SRE}{SFR} \times \frac{NR}{NF} \times Xa \times \frac{RV}{FV} \times Xb$$

The formula is based on the ratio indicating the number of periods, the area ratio, and the voltage ratio, which ratios are all derived from the first and second voltage signal states of the front and rear oxygen sensors 40 and 46.

Furthermore, in order to obtain the catalyst deterioration-measured value (REKCAT), the area ratio times either the ratio indicating the number of times of inversion or an inversion period ratio are multiplied by one weighted factor within the determined arithmetic operating time (TCAL). In addition, the voltage ratio and another weight factor are multiplied together. The result is that, as illustrated in FIG. 6, an inclination defined by the catalyst-purifying rate and the catalyst deterioration-measured value (REKCAT) can be made sharp, which makes it possible to improve the accuracy of judgment on catalyst degradation.

Moreover, the reliability of vehicles on the market is enhanced, thereby eliminating needless repair or replacement of parts, which would otherwise occur as a result of a normal catalyst body 44 being judged as abnormal. Further, environmental aggravation can be prevented because precise repair is achievable for abnormalities in the catalyst body 44.

In addition, a characteristic value according to either an engine load or an exhaust temperature can be added as a correction factor to the above-described formula that determines the catalyst deterioration-measured value (REKCAT). In this way, the addition of the correction factor enables a state of catalyst degradation to be determined with greater accuracy.

As evidenced by the above detailed description, the catalyst deterioration-detecting device according to the present invention is provided with the control means which includes the catalyst deterioration-determining section. When the predetermined catalyst deterioration-determining conditions are established, the determining section determines a degraded state of the catalyst body by taking the successive steps of: respectively measuring the first and second voltage signal-inverted states within the predetermined arithmetic operating time in accordance with inverted states of the first and second voltage signals, thereby calculating the inverted state ratio; respectively measuring the first and second voltage signal-surrounding areas within the predetermined arithmetic operating time in accordance with respective areas which are surrounded by loci of periods of time during which the first and second voltage signals are inverted, thereby calculating the area ratio; respectively measuring first and second voltage signal states within the predetermined arithmetic operating time in accordance with the first and second voltage signals, thereby calculating the voltage ratio; calculating the catalyst deterioration-measured value on the basis of the inverted state ratio, the area ratio, and the voltage ratio; and, comparing the catalyst deterioration-measured value and the catalyst deterioration-determining value, the latter value being set for each engine load. The use of the preceding control means provides simulative determination as to a degraded state of the catalyst body, thereby enabling accurate judgment on a state of catalyst deterioration, even in view of dispersion in measurements as well as vehicles/parts. Furthermore, the degraded state of the catalyst body is determined with reference to the catalyst deterioration-measured value, thereby making it possible to enhance the accuracy of judgment on catalyst degradation. Moreover, the reliability of vehicles is enhanced, which further avoids needless repair or replacement of parts. Yet further, environmental aggravation can be prevented because it is possible to provide precise repair for an abnormal catalyst body.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a catalyst deterioration-detecting device for an internal combustion engine, having first and second exhaust sensors disposed in an exhaust passage of said internal combustion engine respectively on upstream and downstream sides of a catalyst body, said catalyst body being provided generally midway along said exhaust passage, which catalyst deterioration-detecting device provides first feedback control of an air-fuel ratio toward a target value in accordance with the first voltage signal which is output by said first exhaust sensor, while executing a second feedback control of said air-fuel ratio so as to correct said first feedback control in accordance with a second voltage signal which is output by said second exhaust sensor, whereby the deterioration of said catalyst body is determined when predetermined catalyst deterioration-determining conditions are fulfilled, the improvement comprising: a control means having a catalyst deterioration-determining section which determines a degraded state of said catalyst body, when said predetermined catalyst deterioration-determining conditions are established, by taking successive steps of: respectively measuring first and second voltage signal-inverted states within a predetermined arithmetic operating time in accordance with inverted states of first and second voltage signals, thereby calculating an inverted state ratio; respectively measuring first and second voltage signal-surrounding areas within said predetermined arithmetic operating time in accordance with respective areas which are surrounded by loci of periods of time during which said first and second voltage signals are inverted, thereby calculating an area ratio; respectively measuring first and second voltage signal states within said predetermined arithmetic operating time in accordance with said first and second voltage signals, thereby calculating a voltage ratio; calculating a catalyst deterioration-measured value on the basis of said inverted state ratio, said area ratio, and said voltage ratio; and, comparing said catalyst deterioration-measured value and a catalyst deterioration-determining value, the latter value being set for each engine load.

2. A catalyst deterioration-detecting method for an internal combustion engine having first and second exhaust sensors disposed in an exhaust passage of said internal combustion engine respectively on upstream and downstream sides of a catalyst body, the catalyst body being provided generally midway along said exhaust passage, and a catalyst deterioration-detecting device which provides first feedback control of an air-fuel ratio toward a target value in accordance with the first voltage signal which is output by said first exhaust sensor, while executing a second feedback control of said air-fuel ratio so as to correct said first feedback control in accordance with a second voltage signal which is output by said second exhaust sensor, whereby the deterioration of said catalyst body is determined when predetermined catalyst deterioration-determining conditions are fulfilled, the improvement comprising determining a degraded state of the catalyst body, when said predetermined catalyst deterioration-determining conditions are established, by taking successive steps of: respectively measuring first and second voltage signal-inverted states within a predetermined arithmetic operating time in accordance with inverted states of first and second voltage signals, thereby calculating an inverted state ratio; respectively measuring first and second voltage signal-surrounding areas within said predetermined arithmetic operating time in accordance with respective areas which are surrounded by loci of periods of time during which said first and second voltage signals are inverted, thereby calculating an area ratio; respectively measuring first and second voltage signal states within said predetermined arithmetic operating time in accordance with said first and second voltage signals, thereby calculating a voltage ratio; calculating a catalyst deterioration-measured value on the basis of said inverted state ratio, said area ratio, and said voltage ratio; and, comparing said catalyst deterioration-measured value and a catalyst deterioration-determining value, the latter value being set for each engine load.

\* \* \* \* \*